(12) United States Patent
Bear et al.

(10) Patent No.: US 6,528,606 B2
(45) Date of Patent: Mar. 4, 2003

(54) PREPARATION OF A STABLE COMPOSITION OF RADICALLY COPOLYMERISABLE MONOMERS WHICH CONTAINS AT LEAST ONE MONOMER HAVING UREA FUNCTION(S)

(75) Inventors: Marie-Maud Bear, Paris (FR); Xavier Lafosse, Gif-sur-Yvette (FR)

(73) Assignee: Corning S.A., Avon Cedex (FR)

( * ) Notice: Subject to any disclaimer, the term of this patent is extended or adjusted under 35 U.S.C. 154(b) by 0 days.

(21) Appl. No.: 09/870,987

(22) Filed: May 31, 2001

(65) Prior Publication Data

US 2002/0022705 A1 Feb. 21, 2002

(30) Foreign Application Priority Data

May 31, 2000 (FR) .............................................. 00 6989

(51) Int. Cl.[7] .............................................. C08F 126/02
(52) U.S. Cl. .................... 526/302; 526/307.3; 526/320; 526/321; 526/323.1; 526/336; 526/347
(58) Field of Search .............................. 526/302, 307.3, 526/320, 321, 323.1, 336, 347

(56) References Cited

U.S. PATENT DOCUMENTS

| 4,990,575 A | 2/1991 | Lin et al. |
| 5,045,616 A | 9/1991 | Rauterkus et al. |
| 5,480,946 A | 1/1996 | Mueller et al. |

FOREIGN PATENT DOCUMENTS

| EP | 406 161 | 1/1991 |
| EP | 748 685 A | 12/1996 |
| WO | WO 89/05841 | 6/1989 |
| WO | WO 96/34030 | 10/1996 |
| WO | WO 98/50443 | 11/1998 |
| WO | WO 00/19246 | 4/2000 |

OTHER PUBLICATIONS

Database WPI, Section Ch, Week 199418, Derwent Publications Ltd., London, GB; AN 1994–148124, XP002160219 & JP 06 093242 A (Mitsui Toatsu Chem Inc), Apr. 5, 1994.

Patent Abstracts of Japan vol. 016, No. 470 (C–0990), Sep. 30, 1992 & JP 04 169559 A (Nippon Shokubai Co Ltd), Jun. 17, 1992 abstract.

"m–TMI, A Novel Unsaturated Aliphatic Isocyanate" by Robin W. Dexter, Robert Saxon, and Denise E. Fiori, *Journal of Coatings Technology*, vol. 58, No. 737, Jun. 1986.

Primary Examiner—Helen L. Pezzuto
(74) Attorney, Agent, or Firm—Timothy M. Schaeberle; Peter Rogalskyj

(57) ABSTRACT

Disclosed is a method of preparing a stable composition of radically copolymerizable monomers, said composition containing firstly at least one monomer which has at least one urea function in its formula and secondly at least one monomer which does not have an isocyanate function in its formula, said method comprising preparing said monomer (s) having urea function(s) by reaction of two types of reagent: at least one radically copolymerizable monomer which has at least one isocyanate function in its formula with at least one amine selected from primary and secondary amines, and incorporating said monomer(s) which does(do) not have an isocyanate function in its(their) formula, prior to said reaction, together with one of said reagents, before adding the other of said reagents, and/or during the addition of said reagents, and/or after said reaction. Characteristically, within the context of said method, said reaction for preparing said monomer(s) having urea function (s) is carried out in the absence of non-radically polymerizable solvent, with said reagents, monomer(s) having isocyanate function(s) and amine(s), being incorporated in relative proportions such that the isocyanate equivalent/ amine equivalent ratio be between 0.98 and 1.02, and advantageously equal to 1, and said monomer(s) having urea function(s) obtained at the end of said reaction is(are) maintained diluted in the solvent which is constituted of said monomer(s) which does(do) not have an isocyanate function in its(their) formula, in the presence of dissolved oxygen.

43 Claims, No Drawings

PREPARATION OF A STABLE COMPOSITION OF RADICALLY COPOLYMERISABLE MONOMERS WHICH CONTAINS AT LEAST ONE MONOMER HAVING UREA FUNCTION(S)

The present invention relates to the preparation of a stable composition of radically polymerisable monomers, containing at least one monomer having urea function(s). Said composition is stable despite the joint presence within it of said monomer(s) having urea function(s) and at least one monomer of another type which is radically copolymerisable.

The present invention can also be analysed as an original method of preparing monomers having urea function(s), said monomers being, at the end of said original preparation, obtained in solution in a solvent which is constituted of at least one other radically copolymerisable monomer; the resulting composition–monomer(s) having urea function (s)+other monomer(s)–being stable.

Monomers having urea function(s) (monomers which have at least one urea function in their chemical formula) are generally prepared in order then to be copolymerised with at least one monomer of another type.

On a laboratory scale, they are generally prepared and used, as a comonomer, as soon as they are obtained.

On an industrial scale, problems of their manipulation and of their storage are more frequently come up against. With reference to these two problems, the incorporation of a solvent may be opportune, but does involve further manipulations. If they are manipulated and/or stored in the presence of at least one comonomer, the mixture has a tendency to gelify, to solidify.

Confronted with this problem of storage, and more specifically with that of the instability of the compositions based on such mixtures of monomers (compositions which contain at least one monomer having urea function(s) and at least one radically copolymerisable monomer of another type), the Applicant proposes an original solution: an original method of preparing said monomer having urea function (s) which leads to said monomer, stabilised, in solution in at least one other monomer. Furthermore, said stabilised monomer is found under interesting conditions for its future use (as a comonomer). It can be easily manipulated without it being in solution in a solvent, in the sense of the prior art.

U.S. Pat. No. 4,990,575 describes compositions which contain such monomers having urea function(s). Said monomers (ureas having isopropenylic functions) are of the formula (I) below:

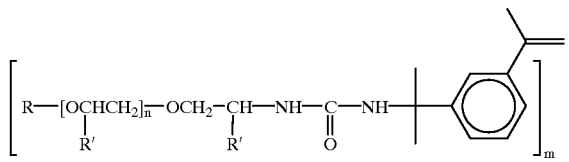

They are obtained by a reaction of 3-isopropenyl-α,α-dimethylbenzyl isocyanate (m-TMI®), of formula:

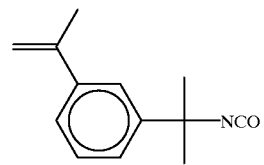

with a polyoxyalkylenepolyamine, of formula:

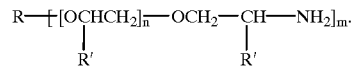

In accordance with the teaching of the examples of the patent, a stoichiometric amount of m-TMI® is added slowly to the polyamines, more specifically to Jeffamines® marketed by the company Huntsman Corporation, to lead to the urea monomers sought after.

These urea monomers, which have isopropenylic functions, do not form a homopolymer by radical polymerisation but can easily be copolymerised with vinylic monomers, of the styrene, acrylate, or methacrylate type. Such copolymerisations are carried out in the presence of radical initiators. Some have been described in the Journal of Coatings Technology, Vol. 58, No. 737, June 1986.

U.S. Pat. No. 4,990,575 describes the synthesis of these urea monomers in the presence or not of a solvent such as isopropanol.

Said urea monomers are, in themselves, solid or very viscous and are therefore difficult to manipulate. Their pumping is not, in any case, an easy thing.

The solutions of these monomers are obviously easier to manipulate, but within the context of the use of said monomers as a comonomer in a copolymerisation reaction, it is necessary sooner or later to get rid of the intervening solvent, generally by evaporation. The evaporation operations do, on an industrial scale, consume much space and energy. Furthermore, they generate problems of safety and of pollution.

Further, the Applicant has described the synthesis of such urea monomers in the applications EP-A-0 977 788 and FR-A-2 783 829. The Applicant has led said synthesis on a laboratory scale, under nitrogen, in the presence of a comonomer, the reagents intervening in stoichiometric amount. The Applicant was not at the time interested in the stability of said monomers on storage. As soon as the monomers were prepared, they were copolymerised.

The Applicant presently proposes a method of preparing a composition of radically copolymerisable monomers, said composition containing firstly at least one monomer which has at least one urea function in its formula and secondly at least one monomer which does not have an isocyanate function in its formula (which monomer is sometimes qualified as <<the other monomer>> in the present text).

The method comprises:
preparing said monomer(s) having urea function(s) by reaction of two types of reagent: at least one radically copolymerisable monomer which has at least one isocyanate function in its formula with at least one amine selected from primary and secondary amines ; and
incorporating said monomer(s) which does(do) not have an isocyanate function in its(their) formula, prior to said reaction, together with one of said reagents before adding the other of said reagents, and/or during the addition of said reagents, and/or after said reaction.

Characteristically, within the context of said method:
said reaction of preparing said monomer(s) having urea function(s) is carried out in the absence of non-radically polymerisable solvent, with said reagents, monomer(s) having isocyanate function(s) and amine(s), being incorporated in relative proportions such that the isocyanate equivalent/amine equivalent ratio be between 0.98 and 1.02, and advantageously equal to 1; and said monomer(s) having urea function(s) obtained at the end of said reaction is(are) maintained diluted in the solvent which is constituted of said monomer(s) which does(do) not have an isocyanate function in its(their) formula, in the presence of dissolved oxygen; the composition thus prepared being stable.

The method of the invention does not make use of a solvent in the sense of U.S. Pat. No. 4,990,575. However, it leads to a stable mixture of monomers which is easy to manipulate (notably easy to pump).

With reference to the stability on storage, the Applicant has demonstrated the crucial importance of the two parameters, below:

the relative proportion of the reagents in question: they must imperatively be incorporated in amounts which are close to stoichiometry, advantageously in stoichiometric amounts, and more specifically in relative proportions such that the isocyanate equivalent/amine equivalent ratio be between 0.98 and 1.02, and advantageously equal to 1. On this point, Examples 1, 1', 1", infra, can be considered;

the presence of dissolved oxygen in the mixture of monomers. It is recommended to incorporate said dissolved oxygen to saturation. In fact, the beneficial effect of the presence of said oxygen is generally felt as soon as said oxygen intervenes at a content of greater than 1% of the content at saturation.

With reference to the convenience of manipulation, the Applicant recommends the incorporation, at least for the storage, even for later on (for the implementation of the reaction), of an entirely original solvent: at least one other radically copolymerisable monomer which does not have an isocyanate function in its formula. The incorporation of said other monomer must not disrupt the relative proportions set forth supra. The incorporation of said other monomer is particularly opportune in the hypothesis in which it constitutes afterwards a partner of copolymerisation of the urea monomer prepared according to the invention. The urea monomers are thus obtained according to the invention in solution in at least one comonomer.

In the light of the comments above, it will already have been understood that the method of the invention is analysed as a method of preparing and of storing a stable composition of specific monomers; the stability of said composition depending upon (being acquired by) the combination of the specific conditions of implementation of the synthesis reaction on the one hand, and, on the other, of the storage. Said specific conditions can be implemented according to numerous variants, the oxygen and the original solvent being incorporated more or less upstream.

Specifications, which are in no way limiting, will now be given on the reagents in question and on the various means of implementation which are possible of the claimed method.

The products below, which are identified by their name, formula, and CAS number:

| NAMES | FORMULA | No. CAS |
|---|---|---|
| 2-isocyanatoethyl methacrylate | $CH_2=C(CH_3)-COOCH_2CH_2NCO$ | 30674807 |
| methacryloyl isocyanate | $CH_2=C(CH_3)-CONCO$ | 4474-60-6 |
| 3-isopropenyl-α, α-dimethylbenzyl isocyanate | $CH_2=C(CH_3)-C_6H_4-C(CH_3)_2-NCO$ | 2094-99-7 |
| allyl isocyanate | $CH_2=CH-CH_2-NCO$ | 1476239 | can notably be used as a radically copolymerisable monomer which has at least one isocyanate function in its formula (which therefore has at least one isocyanate function and at least one radically polymerisable function of the vinylic type in its formula), for the implementation of the method of the invention.

These four products are commercially available from the company Aldrich.

The particularly preferred product is 3-isopropenyl-α,α-dimethylbenzyl isocyanate.

These four products can be used alone or as a mixture.

As primary or secondary amine:
ethylenediamine,
hexamethylenediamine,
butylamine,
xylenediamine,
toluidine,
diaminophenylmethane,
polyoxyalkylene(mono- or poly-)amines: and more particularly polyoxyalkylene(mono)amines (such as Jeffamine® M-1000, marketed by the company Huntsman Corp.), polyoxyalkylenediamines (such as Jeffamine® ED-600 and Jeffamine® ED-2003, marketed by the company Huntsman Corp.), polyoxyalkylenetriamines (such as Jeffamine® T-403, marketed by the company Huntsman Corp.), alone or as a mixture, can notably be used for the implementation of the method of the invention.

The incorporation of polyoxyalkylene (mono-, di- and/or tri-) amines, and more particularly the incorporation of polyoxyalkylene(di)amines, is specifically recommended for the implementation of the method of the invention.

The reaction between such polyoxyalkyleneamines and 3-isopropenyl-α,α-dimethylbenzyl isocyanate is more particularly recommended.

The method of the invention is advantageously carried out with such reagents, notably for the preparation of flexible ophthalmic articles, and photochromic ophthalmic articles.

As regards the reagents in question, the following can be specified with reference to their order of incorporation. The reaction is advantageously carried out by the addition of said monomer(s) having isocyanate function(s) into said amine (s).

As regards the oxygen, it has been seen that it is imperatively incorporated as a stabilising agent for the urea monomers obtained in the original solvent. It is not excluded that the reaction be carried out in the presence of oxygen, even with the addition of oxygen (via an addition of air, in general) into the reaction mixture, but advantageously, said reaction is carried out in the absence of oxygen dissolved in the reaction mixture and a bubbling of gas is ensured at the end of said reaction—into the reaction mixture having reacted—in order to dissolve oxygen within it. Said bubbling of gas is generally a bubbling of air.

Said reaction is in fact advantageously carried out with a bubbling of an inert gas into the reaction mixture, or is carried out under an inert atmosphere. The incorporation of nitrogen or argon is more particularly recommended as inert gas.

Finally, the following can be specified in relation to the original solvent, which is constituted of at least one radically copolymerisable monomer which does not have an isocyanate function in its formula. Said monomer is advantageously a monomer of the acrylic, methacrylic (which can be written: (meth)acrylic), acrylamide, methacrylamide (which can be written: (meth)acrylamide), styrenic, or allylic type. It can notably be selected from styrene, divinylbenzene, methyl methacrylate, benzyl methacrylate, hydroxypropyl acrylate and ethylene glycol dimethacrylate, and mixtures thereof.

Said original solvent can be incorporated at different stages of the reaction in question. It can be incorporated:
prior to the reaction, together with one of the reagents, before adding the other of the reagents. It is thus advantageously incorporated as solvent of the amine(s) before the addition of the monomer(s) having isocyanate function(s) into this(these) amine(s);
during the addition of the reagents;
after the reaction, in order to dilute the monomers having urea function(s) which are obtained at the end of said reaction.

Advantageously, it is incorporated after said reaction.

It is not excluded from the context of the present invention to incorporate said original solvent in several batches.

The most interesting results in terms of stability on storage have been obtained, within the context of the invention, when:
the reagents are incorporated in relative proportions such that the isocyanate equivalent/amine equivalent ratio be equal to 1;
when the monomer(s) having isocyanate function(s) is(are) added to the amine(s), without bubbling of air; and
when the comonomer solvent is added after the reaction.

Advantageously, the method of the invention thus comprises, successively:
adding at least one monomer having isocyanate function(s) to at least one amine selected from primary and secondary amines, in which an inert gas is bubbled, in the absence of all solvent, said amine(s) and monomer(s) being incorporated in relative proportions such that the isocyanate equivalent/amine equivalent ratio be equal to 1, in order to obtain a monomer having urea function(s);
substituting said bubbling with inert gas by bubbling with air and, jointly with said bubbling of air, adding at least one radically copolymerisable monomer which does not have an isocyanate function in its formula to said monomer having urea function(s) obtained.

Whatever the means of carrying out the method of the invention be, it is obviously recommended to store the mixture of monomers obtained in the absence of light (UV, visible). This precision will appear trivial to the person skilled in the art.

The invention is illustrated by Examples 1 to 6 below.

Examples 1' and 1" are comparative examples which demonstrate the critical character in the sense of the invention of the isocyanate equivalent/amine equivalent ratio.

The starting materials used for the implementation of the Examples are identified below:
poly(oxyethylene)diamines of average molecular masses 600 and 2000 respectively, referenced Jeffamine® ED-600 and Jeffamine® ED-2003 respectively, marketed by the company HUNTSMAN Corp;
3-isopropenyl-α,α-dimethylbenzyl isocyanate, referenced m-TMI®, marketed by the company CYTEC; and
benzyl methacrylate, referenced BzMA, marketed by the company ALDRICH.

EXAMPLES 1, 1' AND 1"

60 g of Jeffamine® ED-2003 and 140 g of Jeffamine® ED-600 were mixed at room temperature with 152.8 g of BzMA. The operation is repeated three times. Each of the three mixtures which are obtained contains 0.511 amine equivalent.

Various amounts of m-TMI® are added, slowly, under air, into each one of said three mixtures. The Table below specifies said amounts (Q, expressed in g) as well as the corresponding number of isocyanate functions/number of amine functions ratio (R).

| Examples | Q (g) | R |
| --- | --- | --- |
| 1 | 102.6 | 1 |
| 1' | 92.3 | 0.9 |
| 1" | 112.9 | 1.1 |

Clear liquids are obtained after the complete addition of the m-TMI® into each one of the mixtures.

The three liquids are stored at ambient temperature in the absence of light.

One day after their preparation, the liquids of Examples 1' and 1" show signs of polymerisation within them. They are transformed into a gel. The liquid of Example 1 itself has not changed or evolved.

It is at this juncture clearly shown how much, with reference to the problem of the stability on storage, the parameter R is critical.

EXAMPLES 2 AND 3

Example 1 is repeated as regards the amounts of incorporated monomers, as regards the ratio:

$$R = \frac{\text{number of isocyanate functions}}{\text{number of amine functions}} = \frac{\text{isocyanate equivalent}}{\text{amine equivalent}} = 1$$

For the implementation of Example 2, air is bubbled continuously into the Jeffamines/BzMA mixture during the addition of m-TMI®.

For the implementation of Example 3, air is bubbled into the mixture only after the addition of said m-TMI®.

The solutions obtained are clear. They are still clear after one day of storage.

In order to test their relative stability, under the conditions of accelerated ageing, glass tubes are filled with each one of these solutions. Said tubes are kept in the oven at 50° C. Their viscosity is checked every day.

The solution of the tube of Example 2 (addition of the m-TMI® with bubbling of air) had gelified after 3 days, while that of the tube of Example 3 had gelified only after 8 days.

It is confirmed that it is advantageous to incorporate the air only after the addition of the reagents (Jeffamines®, m-TMI®).

EXAMPLES 4 AND 5

The amounts below of starting materials were used in order to conduct these two examples:

| | |
|---|---|
| 400 g | of Jeffamine ® ED-2003, |
| 933 g | of Jeffamine ® ED-600, |
| 1009 g | of BzMA, |
| 688 g | of m-TMI ®. |

Air is bubbled into each one of the mixtures of reagents throughout the whole synthesis (as in Example 2).

More specifically, implementation was as follows.

EXAMPLE 4

Jeffamine® ED-2003 is melted at 50° C. Jeffamine® ED-600 is added into said melted Jeffamine® ED-2003. Then BzMA is added into the mixture of Jeffamines® obtained. The resulting mixture is cooled to 25° C. and it is only then that the m-TMI® is added. A clear solution is thus obtained.

EXAMPLE 5

Jeffamine® ED-2003 is melted at 50° C. Jeffamine® ED-600 is added into said melted Jeffamine® ED-2003. m-TMI® is added slowly into the mixture of Jeffamines® obtained. At the end of the addition of said m-TMI®, a viscous solution is obtained (at 50° C.). BzMA is then added to said viscous solution to dilute it.

A clear solution is also obtained.

The two solutions of Examples 4 and 5 are still clear after one day after their preparation.

In order to test their relative stability, the implementation is as in Examples 2 and 3 (by ageing in the oven at 50° C.).

The solution of Example 4 had gelified after 3 days, that of Example 5 only after 15 days.

It is confirmed that the comonomer solvent in the sense of the invention (BZMA) is incorporated more advantageously after the reaction (Jeffamines®+m-TMI®).

EXAMPLE 6

The method of the invention was carried out on a larger scale to produce 1553.7 kg of product. Jeffamine® ED-2003 (214.7 kg) stored under nitrogen, is heated to 70° C.; similarly, Jeffamine® ED-600 (501.1 kg), stored under nitrogen, is heated to 70° C. Said two amounts of Jeffamine® ED-2003 and ED-600 are mixed with bubbling of nitrogen within said mixture. The mixture obtained is cooled to 40° C. m-TMI® (371.8 kg) is then added thereto, whilst maintaining the temperature at 40° C. (by controlling the rate of addition). The amounts of reagents in question are such that the number of isocyanate functions/number of amine functions ratio=1.

After the complete addition of said m-TMI®, the mixture is stirred for one hour at 40° C.

At the end of said hour, the nitrogen bubbling is stopped. A bubbling of air is made instead of this. BzMA (466.1 kg) is then added to said mixture under bubbling of air.

The resulting mixture is stirred for one hour. The product finally obtained can be conserved, in a stable manner, for at least 4 months.

What is claimed:

1. A method of preparing a stable composition of radically copolymerisable monomers, said composition containing firstly at least one monomer which has at least one urea function in its formula and secondly at least one monomer which does not have an isocyanate function in its formula, said method comprising:

preparing said monomer(s) having urea function(s) by reaction of two types of reagents: at least one radically copolymerisable monomer which has at least one isocyanate function in its formula and at least one amine selected from primary and secondary amines; and incorporating said monomer(s) which does(do) not have an isocyanate function in its(their) formula, prior to said reaction, together with one of said reagents before adding the other of said reagents, during the addition of said reagents, and/or after said reaction, wherein said reaction of preparing said monomer(s) having urea function(s) is carried out in the absence of non-radially polymerisable solvent and wherein said monomer(s) having isocyanate function(s) and said amine(s) are incorporated in relative proportions such that the isocyanate equivalent/amine equivalent ratio is between 0.98 and 1.02;

wherein said monomer(s) having urea function(s) thus obtained at the end of said reaction is(are) maintained diluted in the solvent which is constituted of said monomer(s) which does(do) not have an isocyanate function in its(their) formula, in the presence of dissolved oxygen; and wherein said reaction is carried out in the absence of oxygen dissolved in the reaction mixture and wherein a bubbling of gas is carried out at the end of said reaction in order to dissolve oxygen within said monomers having urea function(s).

2. The method according to claim 1, wherein said radically copolymerisable monomer(s) which has have) at least one isocyanate function in its(their) formula is(are) selected from 2-isocyanatoethyl methacrylate, methacryloyl isocyanate, 3-isopropenyl-α,α-dimethylbenzyl isocyanate, allyl isocyanate, and mixtures thereof.

3. The method according to claim 1, wherein said amine (s) is(are) selected from ethylenediamine, hexamethylenediamine, butylamine, xylenediamine, toluidine, diaminophenylmethane, polyoxyalkylene (mono- or poly-) amines, and mixtures thereof.

4. The method according to claim 2, wherein said amine (s) is(are) selected from ethylenediamine, hexamethylenediamine, butylamine, xylenediamine, toluidine, diaminophenylmethane, polyoxyalkylene(mono- or poly-)amines, and mixtures thereof.

5. The method according to claim 1, wherein said reaction is carried out by adding said monomer(s) having isocyanate function(s) into said amine(s).

6. The method according to claim 1, wherein said reaction is carried out with bubbling of an inert gas into the reaction mixture or is carried out under an inert atmosphere. absence of oxygen dissolved in the reaction mixture and wherein a bubbling of gas is carried out at the end of said reaction in order to dissolve oxygen within said monomers having urea function(s).

7. The method according to claim 1, wherein said monomer(s) which does(do) not have an isocyanate function in its(their) formula is(are) selected from monomers of the (meth)acrylic, (meth)acrylamide, styrenic, or allylic type.

8. The method according to claim 7, characterised in that said monomer(s) which does(do) not have an isocyanate function in its(their) formula is(are) selected from styrene, divinylbenzene, methyl methacrylate, benzyl methacrylate, hydroxypropyl acrylate, ethylene glycol dimethacrylate, and mixtures thereof.

9. The method according to claim 1, wherein said monomer(s) which does(do) not have an isocyanate function in its(their) formula is(are) incorporated prior to said reaction, together with one of said reagents, before adding the other of said reagents, during the addition of said reagents, or after said reaction.

10. The method according to claim 2, wherein said stable composition of radically copolymerisable monomers is saturated with dissolved oxygen.

11. The method according to claim 3, wherein said stable composition of radically copolymerisable monomers is saturated with dissolved oxygen.

12. The method according to claim 4, wherein said stable composition of radically copolymerisable monomers is saturated with dissolved oxygen.

13. The method according to claim 1, wherein said stable composition of radically copolymerisable monomers is saturated with dissolved oxygen.

14. The method according to claim 7, wherein said stable composition of radically copolymerisable monomers is saturated with dissolved oxygen.

15. The method according to claim 8, wherein said stable composition of radically copolymerisable monomers is saturated with dissolved oxygen.

16. The method according to claim 1, wherein said method comprises, successively:

adding at least one monomer having isocyanate function(s) to at least one amine selected from primary and secondary amines, in which an inert gas is bubbled, in the absence of all solvent, said amine(s) and monomer(s) being incorporated in relative proportions such that the isocyanate equivalent/amine equivalent ratio is equal to about 1, in order to obtain a monomer having urea function(s);

substituting said bubbling with inert gas by bubbling with air and, jointly with said bubbling of air, adding at least one radically copolymerisable monomer which does not have an isocyanate function in its formula to said monomer having urea function(s).

17. A composition of radically copolymerisable monomers prepared by the method according to claim 6.

18. A composition of radically copolymerisable monomers prepared by the method according to claim 1.

19. A composition of radically copolymerisable monomers prepared by the method according to claim 7.

20. A composition of radically copolymerisable monomers prepared by the method according to claim 13.

21. A composition of radically copolymerisable monomers prepared by the method according to claim 16.

22. A copolymer prepared by radically copolymerising the composition of claim 17.

23. A copolymer prepared by radically copolymerising the composition of claim 18.

24. A copolymer prepared by radically copolymerising the composition of claim 19.

25. A copolymer prepared by radically copolymerising the composition of claim 20.

26. A copolymer prepared by radically copolymerising the composition of claim 21.

27. A method of preparing a stable composition of radically copolymerisable monomers, said composition containing firstly at least one monomer which has at least one urea function in its formula and secondly at least one monomer which does not have an isocyanate function in its formula, said method comprising:

preparing said monomer(s) having urea function(s) by reaction of two types of reagents: at least one radically copolymerisable monomer which has at least one isocyanate function in its formula and at least one amine selected from primary and secondary amines; and incorporating said monomer(s) which does(do) not have an isocyanate function in its(their) formula, prior to said reaction, together with one of said reagents before adding the other of said reagents, during the addition of said reagents, and/or after said reaction, wherein said reaction of preparing said monomer(s) having urea function(s) is carried out in the absence of non-radially polymerisable solvent and wherein said monomer(s) having isocyanate function(s) and said amine(s) are incorporated in relative proportions such that the isocyanate equivalent/amine equivalent ratio is between 0.98 and 1.02;

wherein said monomer(s) having urea function(s) thus obtained at the end of said reaction is(are) maintained diluted in the solvent which is constituted of said monomer(s) which does(do) not have an isocyanate function in its(their) formula, in the presence of dissolved oxygen; and wherein said reaction is carried out in the absence of oxygen dissolved in the reaction mixture and wherein, at the end of said reaction, oxygen is introduced under conditions effective to dissolve oxygen within said monomers having urea function(s).

28. The method according to claim 27, wherein said radically copolymerisable monomer(s) which has(have) at least one isocyanate function in its(their) formula is(are) selected from 2-isocyanatoethyl methacrylate, methacryloyl isocyanate, 3-isopropenyl-α,α-dimethylbenzyl isocyanate, allyl isocyanate, and mixtures thereof.

29. The method according to claim 27, wherein said amine(s) is(are) selected from ethylenediamine, hexamethylenediamine, butylamine, xylenediamine, toluidine, diaminophenylmethane, polyoxyalkylene(mono- or poly-)amines, and mixtures thereof.

30. The method according to claim 29, wherein said amine(s) is(are) selected from ethylenediamine, hexamethylenediamine, butylamine, xylenediamine, toluidine, diaminophenylmethane, polyoxyalkylene (mono- or poly-) amines, and mixtures thereof.

31. The method according to claim 27, wherein said reaction is carried out by adding said monomer(s) having isocyanate function(s) into said amine(s).

32. The method according to claim 27, wherein said reaction is carried out with bubbling of an inert gas into the reaction mixture or is carried out under an inert atmosphere.

33. The method according to claim 27, wherein said monomer(s) which does(do) not have an isocyanate function in its(their) formula is(are) selected from monomers of the (meth)acrylic, (meth)acrylamide, styrenic, or allylic type.

34. The method according to claim 33, wherein said stable composition of radically copolymerisable monomers is saturated with dissolved oxygen.

35. The method according to claim 27, wherein said stable composition of radically copolymerisable monomers is saturated with dissolved oxygen.

36. A composition of radically copolymerisable monomers prepared by the method according to claim 27.

37. A composition of radically copolymerisable monomers prepared by the method according to claim 32.

38. A composition of radically copolymerisable monomers prepared by the method according to claim 33.

39. A composition of radically copolymerisable monomers prepared by the method according to claim 35.

40. A copolymer prepared by radically copolymerising the composition of claim 36.

41. A copolymer prepared by radically copolymerising the composition of claim 37.

42. A copolymer prepared by radically copolymerising the composition of claim 38.

43. A copolymer prepared by radically copolymerising the composition of claim 39.

* * * * *